(12) United States Patent
Uthe

(10) Patent No.: US 7,627,682 B2
(45) Date of Patent: Dec. 1, 2009

(54) METHOD AND SYSTEM TO EVALUATE UTILIZATION OF RESOURCES

(75) Inventor: Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 10/711,042

(22) Filed: Aug. 19, 2004

(65) Prior Publication Data

US 2006/0039293 A1 Feb. 23, 2006

(51) Int. Cl.
*G06F 15/16* (2006.01)

(52) U.S. Cl. ...................................... 709/229

(58) Field of Classification Search ................ 370/238, 370/252; 709/203, 224–226, 229
See application file for complete search history.

(56) References Cited

U.S. PATENT DOCUMENTS

| 6,377,287 B1 | 4/2002 | Hao et al. | |
|---|---|---|---|
| 6,470,383 B1 | 10/2002 | Leshem et al. | |
| 6,499,034 B1 | 12/2002 | Mackinlay | |
| 6,654,803 B1 | 11/2003 | Rochford et al. | |
| 2002/0152305 A1* | 10/2002 | Jackson et al. | 709/224 |
| 2002/0194251 A1* | 12/2002 | Richter et al. | 709/105 |
| 2003/0038836 A1 | 2/2003 | Ronald et al. | |
| 2003/0225876 A1 | 12/2003 | Oliver et al. | |

FOREIGN PATENT DOCUMENTS

| JP | 2002-116978 | 4/2002 |
|---|---|---|
| WO | WO 99/54834 | 10/1999 |
| WO | WO 02/01448 A1 | 1/2002 |

OTHER PUBLICATIONS

Domel, "Webmap —A Graphical Hypertext Navigation Tool," *The Second Int'l. WWW Conf. Fall '94 Chicago*, pp. 1-14, Sep. 1, 1994.

* cited by examiner

*Primary Examiner*—Seema S. Rao
*Assistant Examiner*—Leon Andrews
(74) *Attorney, Agent, or Firm*—Charles L. Moore; R. Brian Drozd; Moore & Van Allen, PLLC

(57) ABSTRACT

A method to evaluate utilization of a plurality of resources linked by segments may include tracking a sequence of utilization of the plurality of resources in responding to a request or a set of requests and representing a quantity of occurrences of each segment linking resources in the sequence. The method may also include representing a time duration since each resource was last utilized.

26 Claims, 5 Drawing Sheets

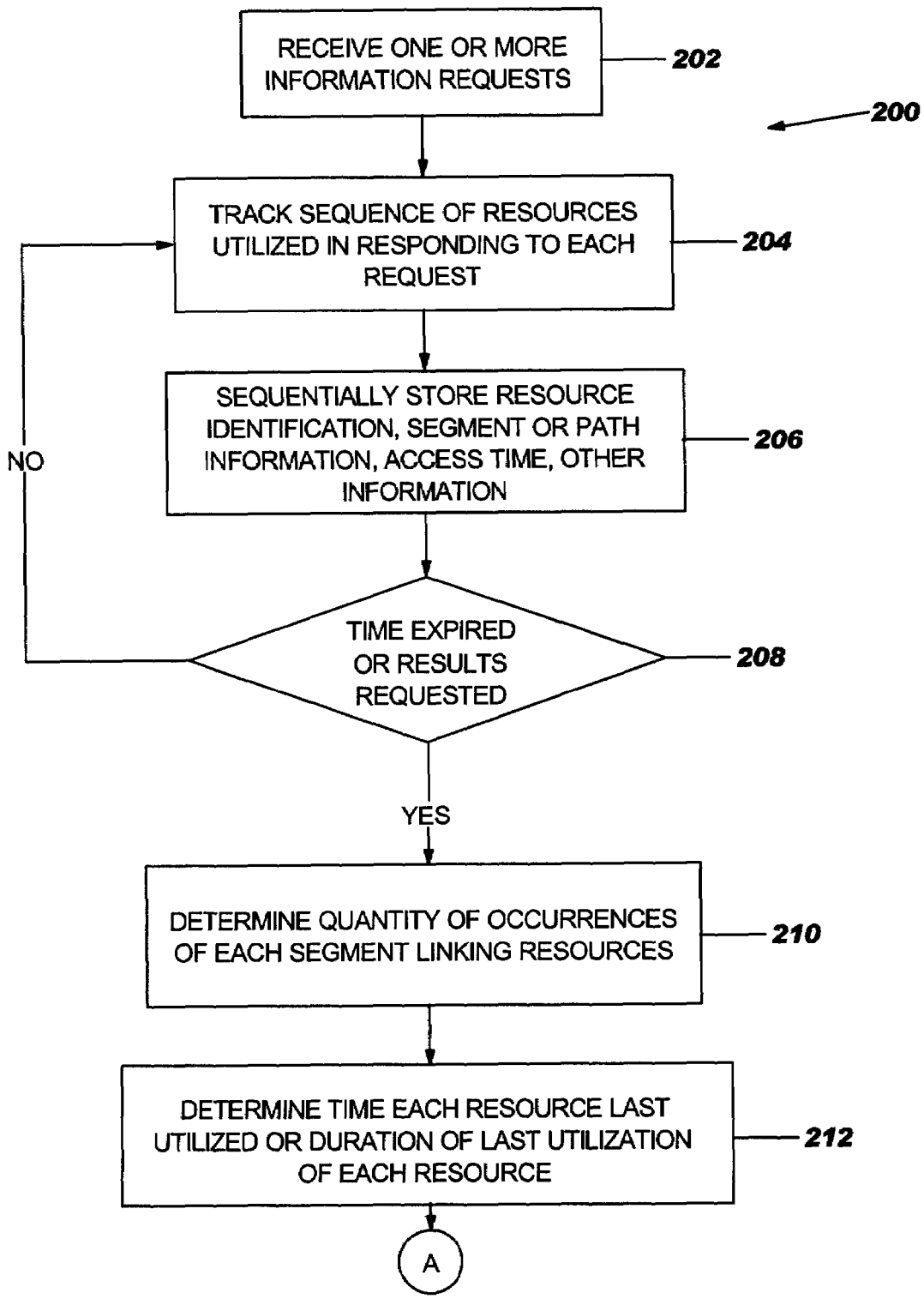

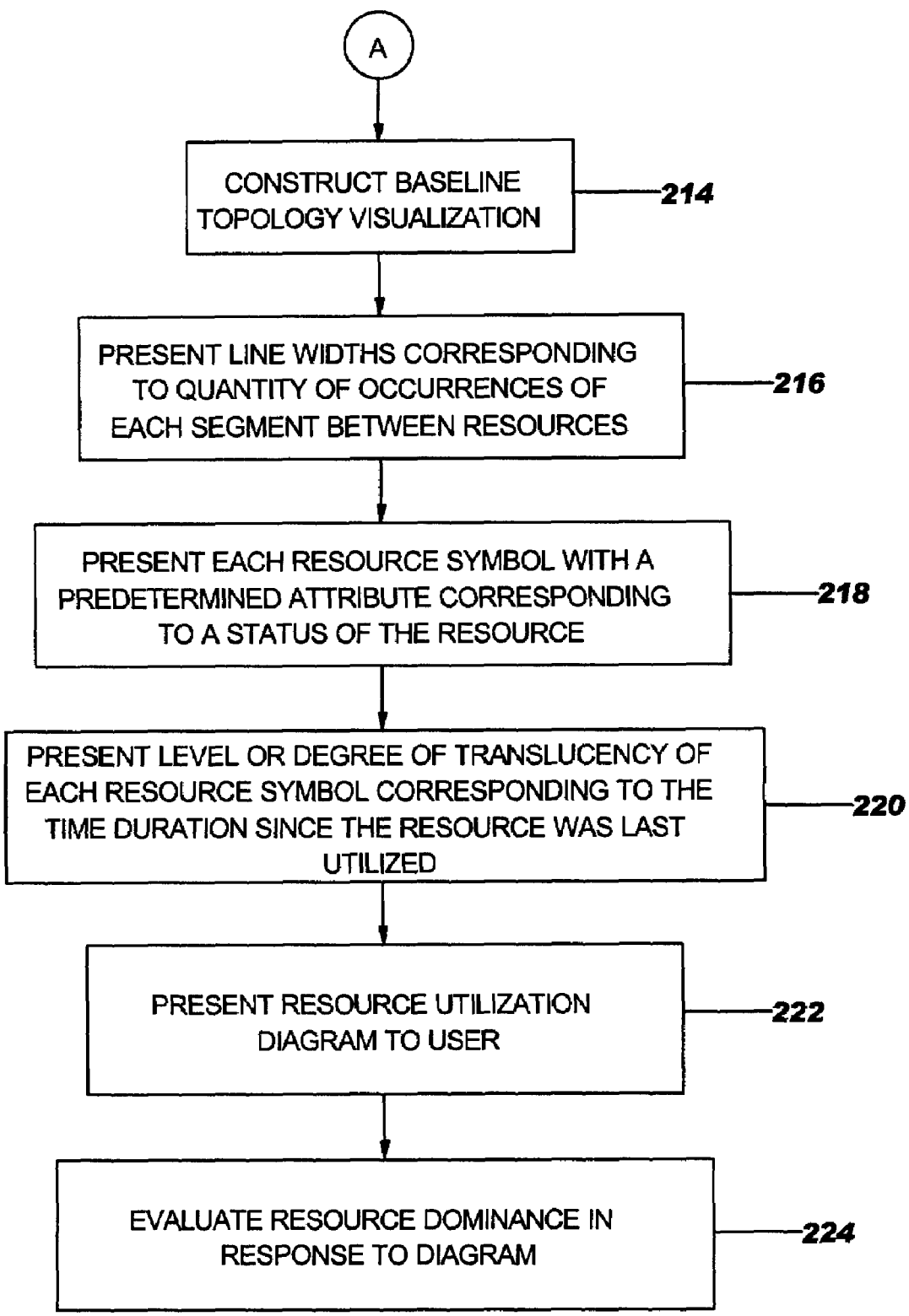

METHOD AND SYSTEM TO EVALUATE UTILIZATION OF RESOURCES

BACKGROUND OF INVENTION

The present invention relates to utilization of resources in an information technology system or a network, such as the Internet or private network and more particularly to a method and system to evaluate utilization of resources in an information technology system or network.

There is a need to evaluate the performance of information technology systems and networks for purposes such as maintenance, making adjustments or changes, adding additional capacity or the like. As part of evaluating the performance of such systems and networks, the utilization of information technology (IT) resources, such as web sites, databases, applications, networking components or the like, may need to be evaluated. A simple representation of the different resources utilized in responding to different requests for information or data over a period of time that includes the number of times the resource was accessed or the number of occurrences of segments between resources and a time duration since each resource was last utilized would be useful in evaluating such systems or networks for improvements or maintenance.

SUMMARY OF INVENTION

In accordance with an embodiment of the present invention, a method may be utilized to examine data cataloging the performance and exploitation of information technology (IT) resources, such as applications and/or networking, to satisfy a set of requests upon the system. Resources, and paths between resources, which appear or are utilized more frequently to satisfy the requests may be considered to be more significant than resources, and paths between resources, which are used rarely. When visualizing the set of resources, and the paths between resources, the more significant items may be rendered to be visually more significant. For example, when displaying the set of resources and paths in a two dimensional topology, nodes representing resources and segments representing paths may be rendered bigger based upon the number of occurrences in system requests. The detail rendered for a specific node and segment may be based upon the time the corresponding item was last utilized. Resources and paths between resources, used more recently may be in full color. Those resources not utilized for a period of time may be rendered with progressively less detail, using different amounts of transparency for example.

In accordance with an embodiment of the present invention, a method to evaluate utilization of a plurality of resources linked by segments may include tracking a sequence of utilization of the plurality of resources in responding to a request or set of requests. The method may also include representing a quantity of occurrences of each segment linking resources in the sequence.

In accordance with an embodiment of the present invention, a method to evaluate utilization of a plurality of resources linked by segments may include tracking a sequence of utilization of the plurality of resources in responding to a request or set of requests. The method may also include representing a time duration since each resource was last utilized.

In accordance with an embodiment of the present invention, a method to evaluate utilization of a plurality of resources linked by segments may include tracking a sequence of utilization of the plurality of resources in responding to a request or set of requests. The method may also include determining a quantity of occurrences of each segment linking resources in the sequence and determining a time duration since each resource in the sequence was last utilized.

In accordance with an embodiment of the present invention, a system to evaluate utilization of a plurality of resources linked by segments may include a processor and a resource utilization program operable on the processor. The resource utilization program may include computer executable instructions to track a sequence of utilization of the plurality of resources in responding to a request or set of requests. The resource utilization program may also include computer executable instructions to determine a quantity of occurrences of each segment linking resources in the sequence.

In accordance with an embodiment of the present invention, a system to evaluate utilization of a plurality of resources linked by segments may include a processor and a resource utilization program operable on the processor. The resource utilization program may include computer executable instructions to track a sequence of utilization of the plurality of resources in responding to a request or set of requests. The resource utilization program may also include computer executable instructions to represent a time duration since each resource was last utilized.

In accordance with an embodiment of the present invention, method of making a system to evaluate utilization of a plurality of resources linked by segments may include providing a processor and providing a resource utilization program operable on the processor. Providing the resource utilization program may include providing computer executable instructions to track a sequence of utilization of the plurality of resources in responding to a request or set of requests. Providing the resource utilization program may also include providing computer executable instructions to determine a quantity of occurrences of each segment linking resources in the sequence.

In accordance with another embodiment of the present invention, a computer-readable medium having computer-executable instructions for performing a method that may include tracking a sequence of utilization of the plurality of resources in responding to a request or set of requests. The method may also include determining a quantity of occurrences of each segment linking resources in the sequence.

BRIEF DESCRIPTION OF DRAWINGS

FIGS. 2A and 2B (collectively FIG. 2) are a flow chart of an example of a method to evaluate utilization of resources in accordance with an embodiment of the present invention.

DETAILED DESCRIPTION

The following detailed description of preferred embodiments refers to the accompanying drawings which illustrate specific embodiments of the invention. Other embodiments having different structures and operations do not depart from the scope of the present invention.

Figure 1:
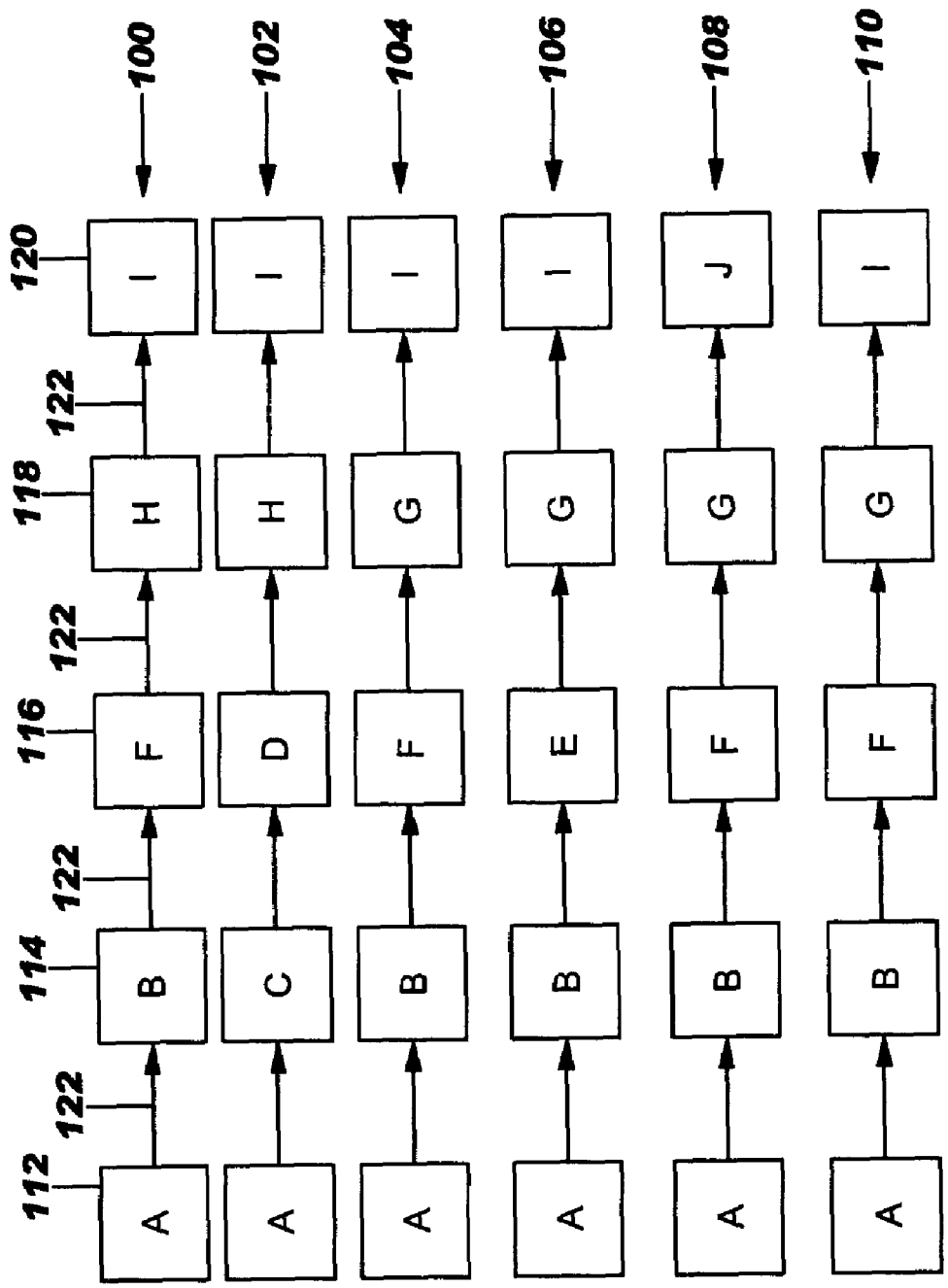
FIG. 1 is a illustration of an example of responses to a set of requests and the resources that may be sequenced together to fulfill each request.

FIG. 1 is an illustration of an example of responses to a set of requests and the resources that may be sequenced together to fulfill each request. Each line or sequence 100-110 represents a response to a request and the resources that may be used to satisfy the request. The different lettered boxes 112-120 correspond to different resources utilized to satisfy the request and the arrows 122 between the lettered boxes correspond to paths between the different resources. Examples of resources, and sequences of resource usages, may be information technology (IT) resources, such as networking adapters, routers or the like, which in sequence pass data back and forth to provide a communication session between two applications, or resources such as servlets that make up a web site where a user navigates through a sequence of servlets. In these examples a unique request may be a data packet being sent between two applications, or a user session with the web application. To fulfill the request a set of resources are utilized in a sequence, where the given sequence can quite likely change when processing subsequent requests.

FIGS. 2A and 2B (collectively FIG. 2) are a flow chart of an example of a method 200 to evaluate utilization of resources in accordance with an embodiment of the present invention. In block 202 of method 200, a request or set of requests for information or data may be received via a communication network similar to that described above. In block 204, a sequence of resources utilized or accessed in responding to the request or each request in the set of requests may be tracked. The sequence of resources may be tracked using known techniques. In block 206, a resource identification for each resource utilized or accessed is used to maintain statistics on the usage of unique resources across the set of request. For example, statistics captured could include the number of times the resource is used, the timestamp of the resources last use, and the average time spent within that resource processing its part of a request. This type of information as well as other information that may be helpful for evaluation of the utilization of resources may also be stored in block 206. Similar statistics gathering would be employed for each unique segment between two given resources.

In block 208, a determination may be made whether a predetermined time period has expired or a request for results has been received from a user or administrator. In other embodiments of the present invention a determination may be made in block 208 whether the sequence has been completed or the request or set of requests have been satisfied. If the response in block 208 is no, the method 200 may return to block 204 where the method 200 continues to track the sequence of resources and store the desired information as illustrated by blocks 204 and 206. Accordingly, the method 200 may continue to track the utilization of resources and store the resource identifications, segment or path information linking sequential resources and a time of access of each resource in the sequence until one of a predetermined time period expires, the sequence is completed, the request or set of requests is satisfied, or a request for results or a resource utilization diagram in received. An example of a resource utilization diagram will be discussed with reference to FIG. 3.

If one of a predetermined time period has expired, the sequence is completed, the request or set of requests satisfied or a request for results has been received in block 208, the method 200 may advance to block 210. In block 210, a quantity of occurrences of each resource and each segment linking sequential resources may be determined by consulting the statistics gathered in block 206. In block 212, a time each resource or segment linking sequential resources was utilized or a time duration since each resource or segment was last utilized may be determined.

In block 214, a 2-dimensional graphical topology may be constructed. Resources can be represented as a geometric shape or with an icon, associations between resources are conveyed by lines between the graphical representations of the corresponding resources, color conveys some attribute like operational status or other attribute. The topology visualization constructed in block 214 conveys the summary of resources utilized, and the summary of which resources were directly sequenced together. In block 216, a quantity or number of occurrences of each resource, and each segment or path linking resources may be depicted by augmenting the default topology visualization constructed in block 214. In one embodiment of the present invention, each segment or path between a pair of sequential resources may be represented in a resource utilization diagram by a line between predetermined resource symbols representing each resource utilized in a sequence to respond to a request or set of requests. Each line may have a selected line width corresponding to a quantity of occurrences of the segment in responding to the request or set of requests. For example segments that were used the most during a predetermined time period, request or set of request may be represented by the widest lines while segments that were used the least or not at all may be represented by the narrowest of lines or by a dashed or broken line to indicate a linking or path between the resources but that the segment or path was used very little or not at all during the evaluation time period under consideration. Similarly, resources used the most may be displayed larger than those seldom used.

Any means or techniques may be used to illustrate the quantity of occurrences of each segment or path between resources in a sequence. For example, a numeral indicating the quantity of occurrences may be illustrated in associating with the line representing the segment. In another embodiment of the present invention, a slash mark may be shown across each line to illustrate each occurrence of the segment or path in a sequence.

Figure 3:
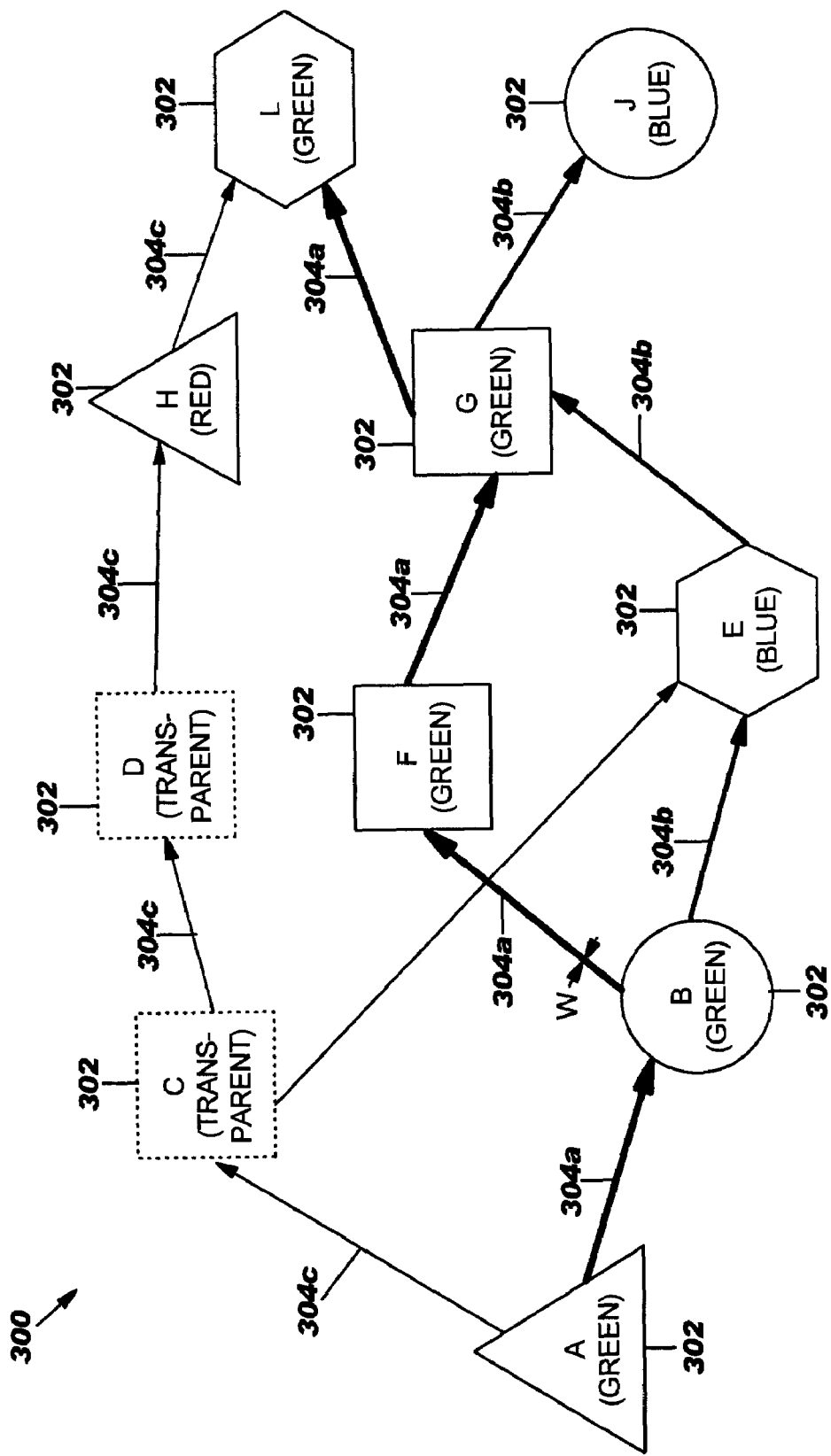
FIG. 3 is an example of a resource utilization diagram in accordance with an embodiment of the present invention.

Similar to that described with respect to block 214, in block 218, each resource may be presented with a predetermined attribute corresponding to a status of the resource or other information related to the resource. As described in more detail with respect to FIG. 3, each of the resources may be represented by a predetermined resource symbol in a resource utilization diagram. As examples, the predetermined resource symbols may be illustrated with different attributes, such as size, shape, color, as illustrated in FIG. 3, or similar attributes. The different attributes may correspond to different statuses of the resources or other information related to the resources. For example, the different sizes, shapes and colors may illustrate different types of resource, whether a resource was active during an evaluation time period, type of difficult or problem a resource may have been experiencing during an evaluation time period, and like.

In block 220, a time duration since the resource or segment linking resources was last utilized may be depicted by augmenting the default topology visualization constructed in block 214. As an example, each resource symbol may be illustrated in a resource utilization diagram with a predetermined level or degree of translucency that may correspond to the time duration since the resource was last utilized. For example, resources or segments linking resources that were recently utilized in a sequence to respond to an information request or set of requests may be fully visualized (no transparency) while resources or segments linking resources that have not been used or have not been used for the longest duration may be substantially transparent. Other examples of illustrating a time duration since the resource was last utilized may include illustrating the time numerically in association with each resource or segment, or graphically by displaying a "clock" icon whose size and color convey time duration.

Figure 4:
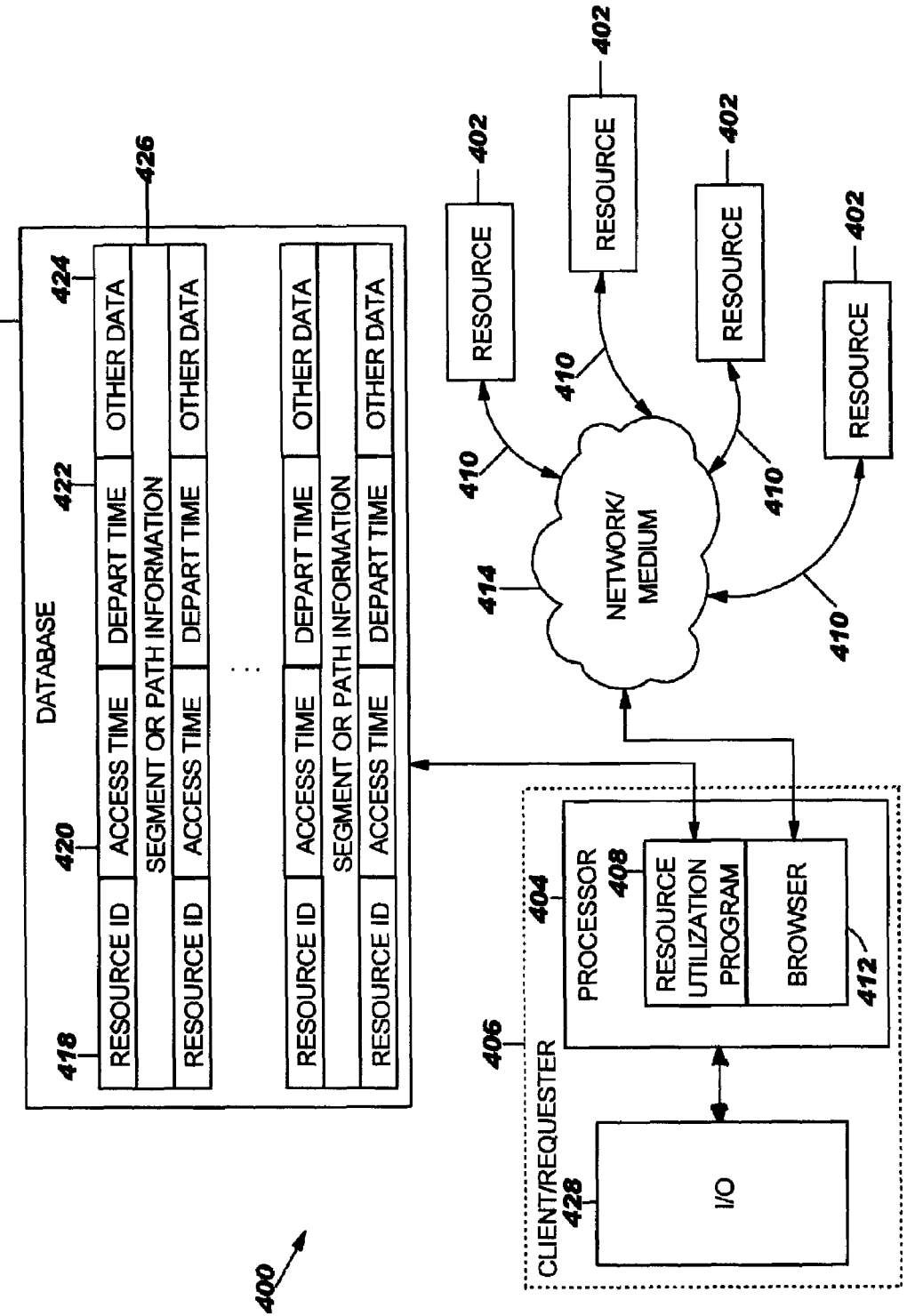
FIG. 4 is an example of a system to evaluate utilization of resources in accordance with an embodiment of the present invention.

In block 222, the resultant topology visualization from blocks 214, 216, and 220, or a similar graphical, tabular, or other type or form representation of the resource utilization diagram may be presented to a user or requestor. The diagram may be presented on an output device, such as a monitor or printer of a computer system or the like. An example of one such system is illustrated in FIG. 4.

In block 224 a resource dominance may be evaluated in response to the diagram or other representation. Adjustments or modifications may be made in light of the diagram to improve the utilization of the resources and operation of the systems associated with the resources.

FIG. 3 is an example of a resource utilization diagram 300 in accordance with an embodiment of the present invention. The resource utilization diagram may be formed as a result of the method 200 of FIGS. 2A and 2B. The diagram 300 may represent a sequence of utilization of a plurality of resources, such as web sites, database servers and the like, that may be accessed or utilized in responding to a request or a set of requests for information or data. Each of the resources may be represented by a predetermined resource symbol 302 in diagram 300. Each segment or path between resources may be represented by a line 304 between sequential resource symbols 302. As previously described, each line 304 may have a selected line width "W" corresponding to a quantity or number of occurrences of the segment in responding to a request or set of requests. For example, a higher quantity of occurrences of each segment between resources may correspond to a wider selected width "W" of the line 304 compared to a lower quantity of occurrences of a segment. To further illustrate this feature, lines 304a have the widest selected width and represent segments with the highest quantity of occurrences. Lines 304c have the narrowest selected width and represent segments with the lowest quantity of occurrences in the sequence and lines 304b have a selected width between the widths of lines 304a and 304c illustrating an intermediate quantity of occurrences of the segments represented by these lines. Similarly, resource 302 could be enlarged to convey a high usage, or shrunk to covey seldom use. The diagram 300 may represent a utilization of resources in responding to a request or set of request over a predetermined time period.

Each resource symbol 302 may be represented with a predetermined attribute that may correspond to a status of the resource, type of resource or other feature or parameter related to the resource. As illustrated in FIG. 3, examples of these predetermined attributes may include a shape of the resource symbol 302, a color of the resource symbol, as illustrated parenthetically in each resource symbol, or similar indication. As previously discussed, the attribute may represent a type of resource, a resource status (active or inactive) or similar condition.

FIG. 4 is an example of a system 400 to evaluate utilization of resources 402 in accordance with an embodiment of the present invention. The system 400 may include a processor 404 that may be accessed by a user or requestor 406. A resource utilization program 408 may operate on the processor 404. The resource utilization program 408 may embody elements of the method 200 described with respect to FIGS. 2A and 2B to present a resource utilization diagram, such as the diagram 300 illustrated in FIG. 3, or some other representation of resource utilization. Accordingly, the resource utilization program 408 may include computer executable instructions or the like to track a sequence of utilization of a plurality of resources 402 in responding to a request or set of requests similar to that described with respect to method 200. The resource utilization program 408 may also include computer executable instructions or the like to determine a quantity of occurrences of each segment linking pairs of resource in the sequence. The resource utilization program 408 may also include computer executable instructions or the like to generate a resource utilization representation, such as diagram 300 of FIG. 3 or the like, including a representation of the quantity of occurrences of each segment linking the resources.

The system 400 or resource utilization program 408 may also include computer executable instruction or the like to represent each resource by a predetermined symbol, such as symbols 302 of FIG. 3 or similar representations. The system 400 or resource utilization program 408 may also include computer executable instructions to represent each segment 410 or path between or linking resources 402 by a line between corresponding resource symbols similar to that illustrated in FIG. 3 by lines 304. The utilization program 408 may further include computer executable instructions to form each line with a selected line width that may correspond to the quantity of occurrences of the segment in responding to the request or set of requests similar to that described with respect to FIG. 3.

The system 400 or resource utilization program 408 may also include means, computer executable instructions or the like to represent each resource symbol at a predetermined level or degree of translucency corresponding to a time duration since the resource corresponding to the resource symbol was last utilized or accessed. Computer executable instructions may also be provided to represent each resource with a predetermined attribute corresponding to a different possible status of the resource or other information related to the resource. The predetermined attribute may involve coloring each resource symbol one of a plurality of different predetermined colors, or forming each resource symbol in one of a plurality of predetermined shapes, depending upon the status or attribute being illustrated, similar to that described with respect to FIG. 3. Other means or techniques may be used as well to visually designate or distinguish between different attributes or statuses.

The system 400 may also include a browser 412 operable on the processor 404 to access the resources 402 to respond to a request or set of requests. The browser 412 may access the resources 402 via a network 414 which may form the segments 410 or paths between the resources 402 as described above. The network 414 may be any communication network, such as the Internet, private network or the like. The browser 412 may be Netscape®, Microsoft Internet Explorer® or the like. The resource utilization program 408 may operate in association with the browser 412 to track a sequence of utilization of the plurality of resources 402 in responding to a request or a set of requests.

A database 416 may be provided to sequentially store a resource identification (ID) 418 for each resource 402 that may be accessed or utilized in response to a request or set of requests. The database 416 may also store an access time 420 when the resource 402 was accessed or utilized. The database 416 may also store a departure time 422 when the browser 412 departs a current resource 402 or transitions to another resource 402 and may store any other data that may assist in evaluating utilization of resources in a system or network. The database 416 may further store segment or path information 426 so that the number or quantity of occurrences of a segment may be determined.

Input and output devices 428 or combination I/O devices may be coupled to the processor 404 to permit the user 406 or requester to operate and interface with the processor 404. The I/O devices 428 may include a keyboard and pointing device to enter requests and a display or monitor to present resource utilization information to the user 406 or requester, such as the resource utilization diagram illustrated in FIG. 3 or the like. The I/O devices 428 may also include disk drives, optical, mechanical, magnetic, or infrared input/output devices or the like.

Elements of the present invention, such as method 200 of FIGS. 2A and 2B may be embodied in hardware and/or software as a computer program code that may include firmware, resident software, microcode or the like stored on hardware, such as system 400 of FIG. 4 and operable on the system 400. Additionally, elements of the invention may take the form of a computer-readable storage medium having computer-usable or computer-readable program code embodied in the storage medium for use by or in connection with a system, such as system 400 of FIG. 4. A computer-usable or readable storage medium may be any tangible medium that may store the program for use by or in connection with a system.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer-implemented method to evaluate utilization of a plurality of resources linked by segments, comprising:
   tracking a sequence of utilization of the plurality of resources in responding to a request or a set of requests, wherein the tracking is performed by a computer;
   representing a quantity of occurrences of each segment linking resources in the sequence;
   representing a time duration since each resource was last utilized;
   representing each resource by a predetermined resource symbol; and
   representing each segment between a pair of resources in the sequence by a line between the resource symbols corresponding to the pair of resources, wherein each line has a selected line width corresponding to a quantity of occurrences of the segment in responding to the request or set of requests.

2. The method of claim 1, further comprising:
   presenting each resource symbol at a predetermined level or degree of translucency corresponding to a time duration since the resource was last utilized.

3. The method of claim 1, further comprising:
   presenting each resource symbol at a predetermined level or degree of translucency corresponding to a number of times the resource was utilized in responding to the request or set of requests.

4. The method of claim 1, further comprising sequentially storing at least a resource identification, segment or path information between sequential resources and a time of access for each resource in the sequence.

5. The method of claim 4, further comprising continuing to sequentially store the resource identification, segment or path information between sequential resources and time of access for each resource in the sequence until one of a predetermined time period expires, the sequence is completed, the request or set of requests is satisfied, or a request for a resource utilization diagram is received.

6. A computer-implemented method to evaluate utilization of a plurality of resources linked by segments, comprising:
   tracking a sequence of utilization of the plurality of resources in responding to a request or a set of requests, wherein the tracking is performed by a computer;
   representing a time duration since each resource was last utilized;
   representing each resource by a predetermined resource symbol; and
   representing each segment between a pair of resources in the sequence by a line between the resource symbols corresponding to the pair of resources.

7. The method of claim 6, wherein representing a time duration since each resource was last utilized comprises presenting each resource symbol at a predetermined level or degree of translucency corresponding to the time duration since the resource was last utilized.

8. The method of claim 6, further comprising representing a quantity of occurrences of each segment linking resources in the sequence.

9. The method of claim 6, wherein each line has a selected line width corresponding to a quantity of occurrences of the segment in responding to the request or the set of requests.

10. A computer-implemented method to evaluate utilization of a plurality of resources linked by segments, comprising:
    tracking a sequence of utilization of the plurality of resources in responding to a request or set of requests, wherein the tracking is performed by a computer;
    determining a quantity of occurrences of each segment linking a pair of resources in the sequence;
    determining a time duration since each resource in the sequence was last utilized;
    representing each resource by a predetermined resource symbol; and
    representing each segment by a line between the resource symbols corresponding to the pair of resources.

11. The method of claim 10, further comprising representing in a resource utilization diagram the quantity of occurrences of each segment linking resources in the sequence.

12. The method of claim 10, wherein each line has a selected line width corresponding to the quantity of occurrences of the segment in responding to the request or set of requests.

13. The method of claim 10, further comprising:
    representing the time duration since each resource was last utilized.

14. The method of claim 13, wherein representing a time duration since each resource was last utilized comprises presenting each resource symbol at a predetermined level or degree of translucency corresponding to the time duration since the resource was last utilized.

15. The method of claim 10, further comprising sequentially storing at least a resource identification, segment or path information between sequential resources and a time of access for each resource in the sequence.

16. A system to evaluate utilization of a plurality of resources linked by segments, comprising:
    a processor;
    a resource utilization program which operates on the processor, wherein the
    resource utilization program includes:
       computer executable instructions to track a sequence of utilization of the plurality of resources in responding to a request or set of requests;

computer executable instructions to determine a quantity of occurrences of each segment linking a pair of resources in the sequence;

computer executable instructions to determine a time duration since each resource in the sequence was last utilized;

computer executable instructions to represent each resource by a predetermined resource symbol; and computer executable instructions to represent each segment between a pair of resources in the sequence by a line between the resource symbols corresponding to the pair of resources.

17. The system of claim 16, wherein the resource utilization program comprises computer executable instructions to generate a resource utilization representation including a representation of the quantity of occurrences of each segment linking resources in the sequence.

18. The system of claim 16, wherein the resource utilization program comprises computer executable instructions to generate a resource utilization representation including a representation of the time duration since each resource in the sequence was last utilized.

19. The system of claim 16, wherein each line has a selected line width corresponding to the quantity of occurrences of the segment in responding to the request or set of requests.

20. The system of claim 16, further comprising means for representing each resource symbol at a predetermined level or degree of translucency corresponding to a time duration since the resource corresponding to the resource symbol was last utilized.

21. The system of claim 16, further comprising a database to sequentially store a resource identification, segment or path information between sequential resources and time of access for each resource in the sequence.

22. A computer-readable storage medium having computer-readable program code embodied therein, the computer-readable program code comprising:

computer-readable program code configured to track a sequence of utilization of the plurality of resources in responding to a request or set of requests;

computer-readable program code configured to determine a quantity of occurrences of each segment linking resources in the sequence;

computer-readable program code configured to determine each resource based on a predetermined resource symbol;

computer-readable program code configured to determine each segment between a pair of resources in the sequence by a line between the resource symbols corresponding to the pair of resources;

computer-readable program code configured to determine a time duration since each resource in the sequence was last utilized;

computer-readable program code configured to represent each resource by a predetermined resource symbol; and computer-readable program code configured to represent each segment by a line between the resource symbols corresponding to the pair of resources 23. The computer-readable storage medium of claim 22, wherein each line has a selected line width corresponding to the quantity of occurrences of the segment in responding to the request or set of requests.

24. The computer-readable storage medium of claim 22, further comprising computer-readable program code configured to present each resource symbol at a predetermined level or degree of translucency corresponding to a time duration since the resource was last utilized.

25. The computer-readable storage medium of claim 22, further comprising computer-readable program code configured to present each resource symbol at a predetermined level or degree of translucency corresponding to a number of times the resource was utilized in responding to the request or set of requests.

26. The computer-readable storage medium of claim 22, further comprising computer-readable program code configured to sequentially store at least a resource identification, segment or path information between sequential resources and a time of access for each resource in the sequence.

* * * * *

UNITED STATES PATENT AND TRADEMARK OFFICE
CERTIFICATE OF CORRECTION

PATENT NO. : 7,627,682 B2  Page 1 of 1
APPLICATION NO. : 10/711042
DATED : December 1, 2009
INVENTOR(S) : Robert T. Uthe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1426 days.

Signed and Sealed this

Second Day of November, 2010

David J. Kappos
*Director of the United States Patent and Trademark Office*